United States Patent [19]

Christianson

[11] Patent Number: 5,020,774
[45] Date of Patent: Jun. 4, 1991

[54] VARIABLE ORIFICE FLOW REGULATOR

[75] Inventor: Rollin C. Christianson, Las Cruces, N. Mex.

[73] Assignee: The United States of America as represented by the Administrator of the National Aeronautics and Space Administration, Washington, D.C.

[21] Appl. No.: 507,553

[22] Filed: Apr. 11, 1990

[51] Int. Cl.⁵ .................... F16K 31/06; F16K 3/32
[52] U.S. Cl. .................. 251/129.15; 251/148; 251/205; 251/326; 251/363
[58] Field of Search ............... 251/205, 363, 326, 361, 251/148, 129.15

[56] References Cited

U.S. PATENT DOCUMENTS

| | | | |
|---|---|---|---|
| 3,183,926 | 5/1965 | Boudot | 251/326 X |
| 3,417,784 | 12/1968 | Cowan | 251/129.03 X |
| 3,517,697 | 6/1970 | Hott, Jr. et al. | 251/326 X |
| 4,033,550 | 7/1977 | Wheatley et al. | 251/363 X |
| 4,174,728 | 11/1979 | Usnick et al. | |
| 4,568,062 | 2/1986 | Regitz et al. | |
| 4,741,509 | 5/1988 | Bunch et al. | |
| 4,742,987 | 5/1988 | Kanamori et al. | |
| 4,776,566 | 10/1988 | Girdley | |

*Primary Examiner*—Arnold Rosenthal
*Attorney, Agent, or Firm*—Russell F. Schlorff; Harold W. Adams; Edward K. Fein

[57] ABSTRACT

A flow regulator for high-pressure fluids at elevated temperatures includes a body having a flow passage extending between inlet and outlet openings. First and second orifice members are arranged in the flow passage so at least one of the orifice members can be moved transversely in relation to the flow passage between one operating position where the two orifice openings are aligned for establishing a maximum flow rate of fluids flowing through the flow passage and at least one other operating position in which the two openings are moderately misaligned with one another for establishing a predetermined reduced flow rate of fluids flowing through the flow passage.

20 Claims, 1 Drawing Sheet

VARIABLE ORIFICE FLOW REGULATOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S. C. 2457).

BACKGROUND OF THE INVENTION

1. Field of the Invention

High-pressure gaseous oxygen is typically utilized as the oxidizer in the bipropellant systems of many spacecraft. In many of these systems, gaseous oxygen at high pressures are often heated to elevated temperatures of 500-degrees or more before the oxidizer is introduced at a selected flow rate into the combustion chamber of the spacecraft engine.

The invention relates to new and improved flow regulating devices for high-pressure gases that are flowing at extreme temperatures. More particularly, the present invention is directed to new and improved apparatus for regulating the flow of gases such as a high-pressure gaseous oxygen at elevated temperatures as these gases are being discharged into the combustion chamber of a spacecraft rocket engine.

2. Background Art

The typical flow control valve is arranged for regulating the flow of various gases or liquids in a predictable manner over a selected range of flow conditions and pressures and temperatures. With some types of control valves, it is also preferred to arrange the flow passages through those valves to minimize disruptions or significant turbulence of those fluids which are passing through the valves. Generally, little consideration is given to the nature of the fluids which are to be regulated by a particular flow control valve unless those fluids are corrosive (e.g., an acid or a strong caustic) or the fluids are abrasive (e.g., a slurry of fine particulates such as carbon black or coal). It will, of course, be appreciated that in most situations, specialized fluids are readily accommodated either by fabricating the critical components of the regulator valves from appropriate plastics, ceramics or metals or by protecting the exposed surfaces of these components with suitable materials.

Heretofore there has been only a limited demand for flow control devices which are capable of regulating the flow of fluids such as gaseous oxygen at elevated temperatures and pressures. Accordingly, the critical problems of regulating such fluids have not been widely addressed heretofore. As a result, the large majority of the prior-art control valves are generally not suited for controlling these specialized fluids. Therefore, it was not until the advent of rocket propulsion systems that utilize gaseous bipropellants that it became essential to provide flow regulators capable of controlling fluids of such a specialized nature.

In particular, those skilled in the art will appreciate that where a critical fluid such as gaseous oxygen at a high pressure and elevated temperature is to be controlled, the control valve must be carefully designed to minimize the risk of violent combustion of the gas passing through the valve. For instance, where a control valve has a tortuous flow passage, there is always a pronounced risk that gaseous oxygen flowing at high velocities through the valve may be spontaneously ignited by the impact of the gas against flat surfaces or corners present in the flow passage. Moreover, it has been found that the risk of spontaneous combustion is significantly increased by the presence of a few extremely-small metal particles in a high-velocity stream of gaseous oxygen that is flowing through a control valve which has only a modest transition zone or a minor change of direction in its flow passage. Tests have shown, for example, that when even a small number of metal particles which are no larger than 2,000-$\mu$m (0.079-inch) are inadvertently being transported in a high-velocity stream of oxygen, the impact of those particles against metal surfaces within the valve can promote the combustion of the surrounding materials. Thus, since it is substantially impossible to completely eliminate the presence of such minute particles in the flow lines and propellant tanks in the main propulsion system of a bipropellant rocket engine, it is essential that every component in the system be designed to minimize as far as possible the risk that the impact of one or more of these particles against some metal surface in the system will cause a violent combustion in the system.

OBJECTS OF THE INVENTION

Accordingly, it is an object of the present invention to provide new and improved apparatus for regulating the flow of various critical liquids or gases at high pressures and elevated temperatures.

It is a further object of the invention to provide new and improved flow regulating apparatus for fluids such as high-pressure gaseous oxygen to regulate the flow of these fluids at predetermined flow rates in a fluid system.

It is still another object of the invention to provide new and improved flow regulating devices which are arranged for service in rocket propulsion systems employing high-pressure gaseous oxygen at elevated temperatures and which are also cooperatively arranged to greatly minimize the risk that particulate materials being transported by the flowing gas might ignite the gas as it flows through these devices.

SUMMARY OF THE INVENTION

These and other objects of the invention are attained by a flow regulator having a body with a flow passage extending between substantially-aligned inlet and outlet openings. To establish a predetermined maximum flow rate at which a particular fluid can flow through the regulator under given operating conditions, first and second orifice members which respectively have orifice openings of an appropriate size are cooperatively arranged in relation to the central axis of the flow passage so that the orifice openings are in substantial alignment with the inlet and outlet openings. To regulate the flow rate of the fluid without blocking the flow of the fluid through the flow regulator, at least one of the orifice members is cooperatively arranged for movement transversely in relation to the central axis of the flow passage only between one operating position where the two orifice openings are substantially aligned with each other for establishing a predetermined maximum flow rate of the fluid flowing through the flow passage and at least one other operating position in which the two orifice openings are moderately misaligned with one another for establishing at least one predetermined reduced flow rate of the fluid flowing through the flow passage.

BRIEF DESCRIPTION OF THE DRAWINGS

The several features of the invention are set forth with particularity in the appended claims. The arrangement and practice of the invention, together with further objects and various advantages thereof, may best be understood by way of the following description of an exemplary apparatus which incorporates the principles of the invention as illustrated in the accompanying drawings, in which:

DETAILED DESCRIPTION OF THE PREFERRED EMBODIMENT

Figure 1:
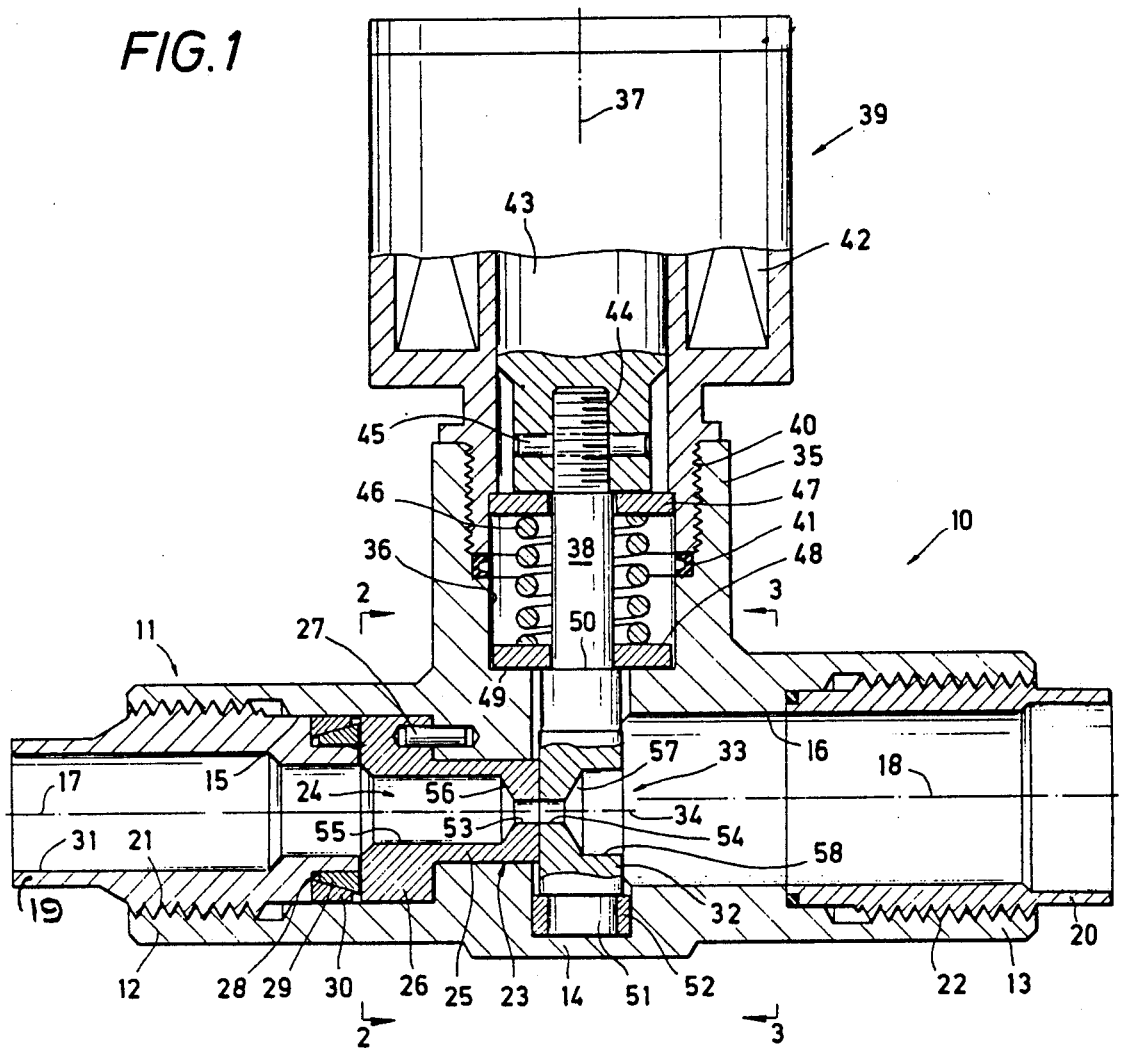
FIG. 1 is a partially cross-sectioned elevational view of a preferred embodiment of a new and improved variable-orifice flow regulator incorporating the principles of the present invention.
Figure 2:
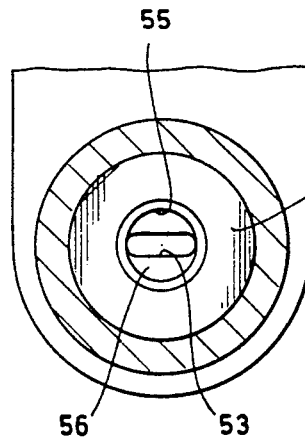
FIG. 2 is a cross-sectional view of the inlet portion of the body of the flow regulator of the present invention and taken along the Lines "2—2" of FIG. 1 to illustrate one predetermined control position of the regulator.

Turning now to FIG. 2, a cross-sectioned elevational view is seen of a preferred embodiment of a new and improved variable-orifice flow regulator 10 which incorporates the principles of the present invention. The flow regulator 10 includes a tubular body 11 having inlet and outlet terminal portions 12 and 13 that are arranged on opposite ends of the intermediate portion 14 of the body. It will be appreciated from FIG. 1 that the new and improved flow regulator 10 illustrated there is arranged so that its inlet and outlet end portions 12 and 13 have longitudinal passages 15 and 16 which are respectively directed along parallel central axes 17 and 18 which, in the illustrated flow regulator, are moderately offset in relation to one another for better accommodating a particular piping configuration (not shown in the drawings). It will, of course, be recognized by those skilled in the art that the terminal portions 12 and 13 and the intermediate portion 14 of the regulator body 11 could have been alternatively arranged along a single commo longitudinal axis (instead of the two moderately-displaced longitudinal axes as at 17 or 18) for positioning the two terminal portions in precise coincidental alignment with one another should it be desired to provide a flow regulator in keeping with the principles of the invention which is to be installed in coincidentally-aligned piping sections of a fluid system.

Although the new and improved flow regulator 10 can be alternatively arranged so that either or both of its integral terminal portions 12 and 13 could be directly connected to the piping sections of a particular fluid system, it is instead preferred to arrange the regulator with removable inlet and outlet tubular adapters 19 and 20 which are respectively coupled to the terminal portions 12 and 13 of the regulator body 11. Thus, in the preferred embodiment of the flow regulator 10, the axial passages 15 and 16 in the terminal portions 12 and 13 are respectively counterbored and threaded, as at 21 and 22, for threadedly coupling the tubular adapters 19 and 20 to their respective terminal portions. In this manner, the flow regulator 10 can be conveniently installed into the piping of any given propellant system by employing inlet and outlet adapters, as at 19 and 20, respectively having free ends appropriately arranged to be tandemly connected to the adjacent ends of the upstream and downstream piping sections of a propellant system (not illustrated in the drawings).

To selectively regulate the flow of fluids through the new and improved variable-orifice flow regulator 10 of the present invention, an elongated tubular orifice member 23 having a central orifice passage 24 is coaxially installed in the axial passage 15 in the inlet terminal portion 12 of the regulator. In the preferred embodiment of the regulator 10, the orifice member 23 is externally shaped to provide a reduced-diameter forward portion 25 that is disposed in the axial passage 15 and an enlarged-diameter rearward portion 26 that is disposed in the counterbored section of the inlet axial passage 15 downstream of the threads 21. The overall length of the orifice member 23 is chosen so that when the inlet adapter 19 is installed in the inlet terminal portion 12, its forward end will be abutted against the enlarged-diameter rearward portion 26 of the stationary orifice member. The orifice member 23 is secured in a predetermined angular position in relation to the regulator body 11 by an alignment pin 27 fitted in opposed blind bores appropriately arranged in the enlarged rear portion 26 of the stationary orifice member and the regulator body.

In the preferred manner of fluidly sealing the stationary orifice member 23 in relation to the regulator body 11, the forward end of the inlet adapter 19 is moderately reduced in diameter so as to define an annular space 28 in the axial passage 15 when the adapter is installed in the terminal portion 12 of the body. Matching inner and outer metal seal rings 29 and 30 respectively having opposed complementally-tapered annular faces are cooperatively fitted together and arranged in the annular space 28 so that the advancement of the inlet adapter 19 along the threads 21 will compress the interfitted metal rings into sealing engagement between the opposed faces of the adapter and the orifice member 23. It will, of course, be appreciated that the seal rings 29 and 30 will effectively prevent the escape of high-pressure fluids through the narrow gap between the opposed faces of the inlet adapter 19 and the stationary orifice member 23.

In the preferred embodiment of the new and improved flow regulator 10 of the invention, a second orifice member 32 is movably disposed in the internal space defined in the mid-portion 14 of the regulator body 11 lying between the axial body passages 15 and 16. As indicated generally at 33, the orifice member 32 includes a longitudinal orifice passage which is cooperatively arranged along a longitudinal axis 34 which is parallel to the body axes 17 and 18.

Figure 4:
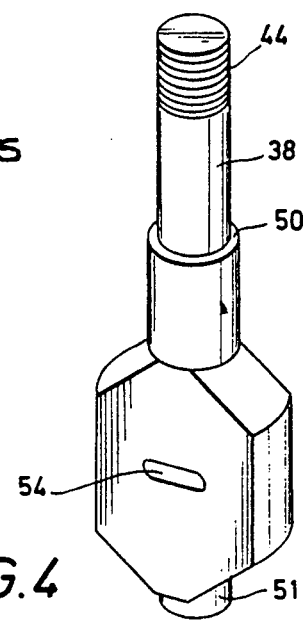
FIG. 4 is an isometric view of a preferred embodiment of a movable orifice or control element for the flow regulator of the present invention.

In keeping with the principles of the present invention, the rearwardly-facing transverse surface of the orifice member 32 is complementally shaped so that when this orifice member is positioned in the regulator body 11, the upstream face of the movable orifice member will be slidably engaged against the forward end surface of the fixed orifice member 23 to enable the orifice member 32 to be moved transversely in relation to the fixed orifice member. Accordingly, as best seen in FIG. 4, in the preferred embodiment of the regulator 10 of the present invention, the upstream face of the movable orifice member 32 is appropriately shaped for defining a flat planar surface which is transverse to and intersected by the central axis 34 of the orifice passage 33. It will be appreciated, therefore, that by arranging the juxtaposed surfaces of the orifice members 23 and 32 to be complemental planar surfaces lying in a transverse plane which is preferably perpendicular to the longitudinal axes 17 and 18, the movable orifice member will be free to be shifted back and forth in that transverse plane.

The intermediate portion 14 of the regulator body 11 is arranged to provide an upright actuator housing 35 defining an enclosed chamber 36 that extends along a central axis 37 perpendicularly intersecting the longitudinal axes 17 and 18 of the terminal portions 12 and 13 of the regulator body. An elongated actuator shaft 38 is coupled to the upper end of the movable orifice member 32 and extended upwardly along the central axis 37 into the lower end of the chamber 36.

As shown generally at 39, a typical plunger-type solenoid actuator is mounted in an upright position on the upper end of the housing 35 and tandemly coupled thereto by means such as matching threads 40. The lower end of the actuator 39 is fluidly sealed in relation to the housing 35 by means such as a seal 41 disposed between the opposed surfaces of the housing and actuator. As is typical, the actuator 39 has an annular solenoid coil 42 encased in a pressure-tight housing that is coaxially arranged around the central axis 37 and carries an armature 43 that is cooperatively disposed within the electrical coil to be longitudinally shifted back and forth along the central axis as the actuator is alternately energized and deenergized. The upper end of the actuator shaft 38 is tandemly coupled to the armature 43 by matching threads 44. To assure that the movable orifice 32 will be correctly oriented with respect to the stationary orifice 23 when the variable-orifice regulator 10 is being assembled, it is preferred to dispose an alignment pin 45 in matching lateral holes appropriately arranged in the mating end portions of the actuator shaft 38 and the armature 43.

To operate the new and improved variable-orifice flow regulator 10, the actuator 39 is cooperatively arranged so that upon selective energization of the solenoid coil 42, the armature 43 and, therefore, the movable orifice member 32 will be elevated in relation to the regulator body 11. To insure the return of the orifice member 32 to its normal operating position illustrated in the drawings, the flow regulator 10 includes biasing means such as a coil spring 46 which is coaxially mounted around the actuator shaft 38 and disposed between upper and lower annular support washers 47 and 48 which are also coaxially mounted around the actuator shaft. The upper washer 47 is engaged against a downwardly-facing shoulder of the housing 35 and the lower washer 48 is normally positioned just above an upwardly-directed internal shoulder 49 arranged near the lower end of the chamber 36. As best seen in FIG. 1, an upwardly-facing shoulder 50 is cooperatively arranged on the mid-portion of the shaft 38 and sized so as to be engaged with the lower washer 48 for supporting the lower washer and carrying it upwardly whenever the actuator shaft is moved upwardly relative to the regulator body 11. It will, therefore, be appreciated that whenever the actuator 39 is operated for elevating the orifice member 32 to a higher operating position, the upward movement of the actuator shaft 38 relative to the regulator body 11 will compress the coil spring 46 between the upper and lower washers 47 and 48 to develop a downwardly-acting biasing force that is sufficient for returning the movable orifice member to its depicted lower operating position when the solenoid coil 42 is subsequently deenergized.

It should be noted that if the regulator 10 were expected to function as a typical valve, it would be essential to arrange a sealing element on the face of one or the other of the orifice members 23 and 32 to prevent fluids from leaking from the orifice passages 24 and 33. Nevertheless, it must be appreciated that the primary function of the variable-orifice regulator 10 of the invention is to maintain the flow of fluids through the regulator at selected flow rates by shifting the movable orifice member 32 to predetermined operating positions. An appropriate control valve (not seen in the drawings) can be arranged at a selected location in the flow line for shutting off the flow of fluids through the new and improved variable-orifice regulator 10.

Accordingly, to support the movable orifice member 32 as it is being shifted back and forth within the regulator body 11, the new and improved regulator 10 further includes means such as a depending stub shaft 51 which is arranged on the lower end of the movable orifice member and axially aligned with the actuator shaft 38. The stub shaft 51 is slidably disposed within an annular bushing 52 that is disposed in a complementary upwardly-facing blind bore in the lower wall of the regulator body 11. It will be recognized, therefore, that by respectively supporting the axially-aligned shafts 38 and 51 in the lower washer 48 and the bushing 52, the juxtaposed faces of the orifice members 23 and 32 will be maintained in firm sliding engagement with one another even under extreme fluid pressures which might otherwise tend to enable the mid-portion of movable orifice member to be moved slightly out of contact with the stationary orifice member.

Accordingly, it has been found that the close sliding fit between the orifice members 23 and 32 which is achieved by firmly supporting the top and bottom of the movable orifice member provides an adequate seal by maintaining at least those portions of the complemental surfaces respectively surrounding the adjacent ends of the orifice passages 24 and 33 in contact with each other as the movable orifice member is being moved transversely in relation to the fixed orifice member. Although this seal is imperfect, it has been found to effectively limit the leakage of pressured fluids between the juxtaposed faces of the orifice members to an acceptable minor level even under extreme fluid pressures. It should also be appreciated that since no sealing element is placed between the juxtaposed surfaces of the orifice members 23 and 32, there is a significant reduction of the frictional force which the actuator 39 and the biasing spring 46 would otherwise have to overcome for shifting the movable orifice member between its upper and lower operating positions. The absence of a sealing member between the orifice members 23 and 32 will, therefore, allow the operating requirements for the solenoid actuator 39 and the biasing spring 46 to be significantly less than the requirements for operating a conventional flow control valve in a corresponding service.

Figure 3:
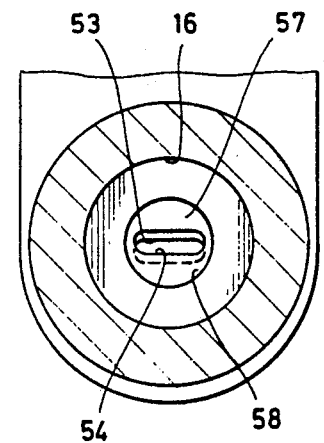
FIG. 3 is a cross-sectional view of the outlet portion of the body of the flow regulator of the invention and taken along the Lines "3—3" of FIG. 1 in order to depict another predetermined control position of the regulator.

Turning now to FIGS. 2 and 3, as illustrated by those oppositely-facing transverse cross-sectional views of the regulator 10, the orifice passages 24 and 33 respectively include orifice throats 53 and 54 preferably defined by oblong transverse openings of identical configuration and size. When the movable orifice member 32 is located in its lower operating position depicted in FIG. 1, the orifice throats 53 and 54 are each coincidentally aligned with the longitudinal axis 17 of the inlet terminal 12 and are superimposed relative to each other to define a uniform flow passage that will permit fluids to flow a predetermined flow rate through the regulator 10. As depicted, it is preferred that the oblong throats 53 and 54 be symmetrically disposed in relation to the axis 17 of the regulator body 11 and angularly oriented relative thereto so as to disposed along their respective major axes lying in a horizontal transverse plane which is perpendicular to the axis 37.

It will be appreciated from FIG. 1 that the orifice passage 24 is preferably formed as an elongated cylindrical bore 55 of uniform diameter in the forward portion of the stationary orifice member 23 and is extended along its longitudinal axis 17 to a frustoconical converging bore 56 that is cooperatively shaped for providing a symmetrical transition zone facilitating the passage of high-pressure fluids into the elongated orifice throat 53 with as little disturbance as possible. As best depicted in FIGS. 1 and 4, the orifice passage 33 of the movable orifice member 32 is correspondingly arranged to include a frustoconical diverging bore portion 57 providing a symmetrical transition zone which will enable the fluids flowing out of the oblong orifice throat 54 to pass with a minimum of disturbance into a cylindrical bore 58 of uniform diameter extending along the longitudinal axis 34 of the orifice passage 33.

By comparing FIGS. 2 and 3, it will be appreciated that when the actuator 39 is operated to lift the movable orifice member 32 to its elevated position, since the oblong orifice throats are lying in a horizontal plane, the throat 54 in the movable orifice member will be only slightly displaced in relation to the throat 53 in the fixed orifice member. Thus, even though the elevated position of the movable orifice member will be effective for reducing the flow rate of fluids passing through the flow regulator 10, there will be only minimum dimensional changes in the flow path through the orifice members 23 and 32 when the movable member is moved to the elevated reduced-flow position shown in FIG. 3. As a result, it will be appreciated by those skilled in the art that the relatively-unobstructed flow path through the new and improved flow regulator 10 will significantly minimize the susceptibility of particle impact ignitions as gaseous oxygen or other hazardous fluids are flowing through the regulator. It should also be recognized from FIG. 3 that the elongated orifice openings 53 and 54 will enable the fluids flowing through the regulator 10 to be controlled with no more than a very small overall stroke for the actuator 39. This, of course, has the obvious advantage of maximizing the available force that the solenoid actuator 39 can employ for operating the regulator 10.

Although the orifice throats 53 and 54 have been shown and described as being horizontal oblong openings of equal size which are uniformly distributed relative to the central axis 17, the scope of the invention is considered to include openings which are dissimilar to one another in both size and configuration. By way of example, the invention could also be practiced with circular openings which would tend to produce even less flow disturbance. Triangular openings would also provide a variable metering function at different positions of the movable orifice member 32. It should also be noted that although the flow regulator 10 is particularly directed toward controlling gaseous oxygen, the principles of the invention can also be employed with a wide variety of liquids and gases.

While only a particular embodiment of the apparatus of the present invention has been shown and described herein, it is apparent that various changes and modifications may be made without departing from the principles of the present invention in broader aspects; and, therefore, the aim in the claims appended hereto is to cover all such changes and modifications as fall within the true spirit and scope of this invention.

What is claimed is:

1. Apparatus for regulating the flow of fluids comprising:
    a body including inlet and outlet flow passages on opposite sides of an intermediate central portion;
    a first fixed orifice member arranged in said inlet flow passage and a transversely movable second orifice member in said central portion, said orifice members having juxtaposed adjacent ends which are shaped for cooperatively defining complemental transverse surfaces as well as first and second longitudinal orifice passages extending between the opposite ends of said orifice members and terminating in first and second reduced throat portions which are respectively circumscribed by said complemental end surfaces and aligned with the longitudinal axis of the fixed orifice in a first flow position;
    means for maintaining at least those portions of said complemental end surfaces surrounding said throat portions of said orifice passages in contact with each other as said second orifice member is being moved transversely in relation to said first orifice member; and
    actuating means cooperatively arranged on said body for selectively moving said second orifice member transversely in relation to said first orifice member only between a first flow-regulating position where said throat portions are in alignment with one another for establishing the first flow rate for fluids flowing through said flow passage and a second flow-regulating position where said throat portions are only partially misaligned in relation to one another to establish a reduced second flow rate for fluids flowing through said flow passage.

2. The apparatus of claim 1 wherein at least one of said reduced throat portions has a non-circular cross section.

3. The apparatus of claim 1 wherein neither of said reduced throat portions has a circular cross section.

4. The apparatus of claim 1 wherein said complemental end surfaces respectively lie along transverse planes which are perpendicular to an axis through said inlet flow passage so that said second orifice member will be moved along a movement axis which is perpendicular to said inlet flow passage axis.

5. The apparatus of claim 1 further including:
    a tubular coupling member threadedly mounted in said inlet flow passage and having a reduced-diameter portion adjacent to said opposite end of said first orifice member and defining an annular space within said flow passage; and
    means for fluidly sealing said coupling member and said first orifice member within said body including matching inner and outer metal seal rings respectively having opposed complementally-tapered annular faces cooperatively fitted together and arranged in said annular space for being compressed together and into sealing engagement between the opposed faces of said coupling member and said first orifice member upon threadedly mounting of said coupling member into said body.

6. The apparatus of claim 5 wherein the first and second throat portions have non-circular cross sections aligned with said first and second longitudinal axes respectively and symmetrically disposed in relation thereto.

7. The apparatus of claim 6 wherein said complemental end surfaces lie along transverse planes which are perpendicular to an axis of said inlet flow passage so that said actuating means will selectively move said second orifice member along an axis of movement which is perpendicular to said inlet flow passage axis and said first and second orifice passages.

8. The apparatus of claim 5 wherein said first and second throat portions have an oblong cross section which are respectively aligned with said inlet flow passage axis and symmetrically disposed relative thereto along major axes lying in transverse planes which are perpendicular to the axis of movement of said second orifice member.

9. The apparatus of claim 8 wherein said first and second throat portions are substantially identical to one another.

10. Apparatus for regulating the flow of fluids comprising:
a body including inlet and outlet terminal portions on opposite sides of an intermediate body portion and having a longitudinal flow passage extending between inlet and outlet openings respectively arranged in said inlet and outlet terminal portions of said body;
a first orifice member mounted in said inlet terminal portion of said body and including a first orifice passage extending along a first longitudinal axis between said inlet opening to a reduced throat portion of said first orifice passage which terminates at a transverse downstream surface of said first orifice member;
a second orifice member cooperatively arranged in said intermediate portion of said body for movement therein along an axis of movement intersecting said first longitudinal axis and having a second orifice passage having a reduced throat portion which terminates at a transverse upstream surface of said second orifice member;
means cooperatively arranged for positioning said first and second orifice members within said body for maintaining said transverse downstream surface of said first orifice member slidably engaged against said transverse upstream surface of said second orifice member; and
actuating means cooperatively arranged for selectively moving said second orifice member transversely in relation to said first orifice member only between a first operating position where said reduced throat portions of said orifice passages are substantially aligned to enable fluids to flow at an selected flow rate through said body and a second operating position where said reduced throat portions are partly misaligned in relation to one another to enable fluids to flow at a reduced flow rate through said body.

11. The apparatus of claim 10 wherein said actuating means include a plunger-type electrical solenoid actuator mounted on said intermediate body portion and having an armature coupled to said second orifice member.

12. The apparatus of claim 10 wherein said reduced throat portions of said first and second orifice passages have non-circular cross sections.

13. The apparatus of claim 12 wherein said reduced throat portions are respectively shaped so that their greatest dimension is extended along a transverse plane which is substantially perpendicular to said axis of movement of said second orifice member to minimize the spacing between its said first and second operating positions.

14. The apparatus of claim 10 where said transverse surfaces of said first and second members respectively lie in first and second transverse planes which are perpendicular to said first longitudinal axis and parallel to said axis of movement of said second member and respectively shaped to complementally engage one another for maintaining sliding contact between those portions of said opposed transverse surfaces surrounding said reduced throat portions.

15. The apparatus of claim 14 wherein said first and second reduced throat portions have non-circular cross sections and are aligned with said first longitudinal axis and symmetrically disposed in relation thereto.

16. The apparatus of claim 15 wherein said first and second reduced throat portions are substantially identical.

17. The apparatus of claim 10 where said transverse surfaces of said orifice members lie along transverse planes that are perpendicular to said first axis so that said axis of movement of said first orifice member will be perpendicular to said first longitudinal axis.

18. The apparatus of claim 16 wherein said first and second reduced throat portions have oblong sections which are respectively aligned with said first axis and symmetrically disposed relative thereto along major axes lying in transverse planes which are perpendicular to said axis of movement of said first orifice member.

19. The apparatus of claim 17 wherein said first and second orifice passages respectively include first and second cylindrical bore portions and first and second transition bores for respectively communicating said cylindrical bore portions to said reduced throat portions.

20. Apparatus for controlling high-pressure fluids comprising:
a body having an elongated flow passage extending along a central body axis;
a tubular member arranged in said flow passage;
means for coupling said body to external piping including a tubular adapter member threadedly coupled into one end of said flow passage and having a reduced-diameter end portion adjacent to said tubular member;
a tubular coupling member threadedly mounted in said flow passage and having a reduced-diameter portion adjacent to said opposite end of said tubular member and defining an annular space within said flow passage; and
means for fluidly sealing said coupling member and said tubular member within said body including matching inner and outer metal seal rings respectively having opposed complementally-tapered annular faces cooperatively fitted together and arranged in said annular space for being compressed together and into sealing engagement between the opposed ends of said coupling member and said tubular member upon threadedly mounting of said coupling member into said body.

* * * * *